United States Patent
Schneider

[11] Patent Number: 5,551,791
[45] Date of Patent: Sep. 3, 1996

[54] BALL JOINT

[75] Inventor: Eberhard Schneider, Halver, Germany

[73] Assignee: P. C. Turck GmbH & Co. KG, Ludenscheid, Germany

[21] Appl. No.: 347,464

[22] PCT Filed: Mar. 23, 1994

[86] PCT No.: PCT/DE94/00336

§ 371 Date: Dec. 15, 1994

§ 102(e) Date: Dec. 15, 1994

[87] PCT Pub. No.: WO94/23218

PCT Pub. Date: Oct. 13, 1994

[30] Foreign Application Priority Data

Mar. 31, 1993 [DE] Germany .............................. 9304897 U

[51] Int. Cl.[6] .............................. F16C 11/00; F16D 1/12
[52] U.S. Cl. .......................... 403/144; 403/138; 403/122; 403/124
[58] Field of Search ..................................... 403/122, 132, 403/133, 134, 135, 136, 137, 138, 140, 144

[56] References Cited

U.S. PATENT DOCUMENTS

| | | | |
|---|---|---|---|
| 3,560,035 | 1/1968 | Kindel | 403/140 |
| 3,945,739 | 3/1976 | Abe | 403/138 |
| 4,720,205 | 1/1988 | Ito | 403/140 |

FOREIGN PATENT DOCUMENTS

| | | | |
|---|---|---|---|
| 2555731 | 6/1976 | Germany | 403/132 |
| 3632265 | 4/1988 | Germany | 403/132 |

*Primary Examiner*—Blair Johnson
*Assistant Examiner*—Bruce A. Lev
*Attorney, Agent, or Firm*—Herbert Dubno; Andrew Wilford

[57] ABSTRACT

A ball joint has a housing forming a cavity, a ball in the housing, and a stem fixed to the ball and extending downward out of the housing. A rigid cover fixed in the housing upwardly closes the cavity over the ball and a metallic lower ball cup in the cavity traversed by the stem is engaged between a lower portion of the ball and the housing and is complementarily fitted to the lower portion of the ball. A metallic plate-like upper ball cup between the ball and the cover is separate from and out of contact with the lower ball cup and has cutouts defining at least one portion bearing resiliently upward on the cover and at least one portion bearing resiliently downward on the ball.

6 Claims, 2 Drawing Sheets 5,551,791

BALL JOINT

CROSS REFERENCE TO RELATED APPLICATIONS

This application is the U.S. national phase of PCT application PCT/DE94/00336 filed Mar. 23, 1994 with a claim to the priority of 23 Mar. 1994. German patent application G 93 04 897.1 filed 31 Mar. 1993.

1. Field of the Invention

The present invention relates to a ball joint. More particularly this invention concerns a ball joint having a housing forming a cavity, a ball in the housing, a stem fixed to the ball and extending downward out of the housing, a rigid cover fixed in the housing and upwardly closing the cavity over the ball, and a compression spring engaged between an upper region of the ball and the housing.

2. Background of the Invention

Such ball joints are used mainly in motor vehicles, for example in steering systems for small trucks, buses, and heavy trucks. In order to eliminate play from the joint a conical coil spring is used as a compression spring between the cover and the upper ball cup. The maximum permissible play between confronting surfaces of these two parts is in the neighborhood of only 0.4 mm. This gap is necessary so that the steering system can give somewhat in response to sudden shocks. The metal-to-metal contact between the upper ball cup and the cover therefore produces a clicking which is very annoying.

OBJECT OF THE INVENTION

It is hence an object of the invention to provide a ball joint of the type described above wherein in a simple manner noise generation in use is suppressed.

SUMMARY OF THE INVENTION

The invention attains this object first and mainly in that the upper ball cup is itself formed as a compression spring in the form of a plate spring and bears constantly directly on the cover and on the ball.

Since the compression spring is always in direct contact with the cover and with the ball, service-related forces only deform the compression spring and do not actually bring together elements that were formerly spaced apart. A substantial further advantage is in the simplified construction and the elimination of a part, since the upper ball cup is itself formed as the compression spring so that the conical coil compression spring of the prior art is eliminated. The above-mentioned object of the invention is attained not by providing an additional part but by eliminating a part.

Whereas in the prior art the ball cups are held in place by the force of the coil spring, according to the invention the upper ball cup is clamped on its outer rim by means of the housing with the cover. Such an arrangement can be compared with a cantilever-mounted but disk-shaped leaf spring.

It is advantageous when the upper ball cup is formed of segments, that is, when the upper ball cup has slits extending radially from its center to near to its continuous edge. Because of the segmenting the deformation of the spring-washerlike ball cup or of its segments can take place without internal stressing.

The upper ball cup is prestressedly deformed like a bell between the cover and the ball.

A further particularly advantageous feature of the invention is that the segments of the upper ball cup have or form bendable sections which tangent the ball along a generally frustoconical surface and whose outside surfaces face an also frustoconical support surface of the cover whose cone angle is somewhat larger than the cone angle of the bendable sections and preferably the arrangement is set up such that the support surface turned toward the cover is somewhat convex relative to the bendable sections of the upper ball cup so that with increasing loading the contact point of the upper ball cup or its segments moves inward on the cover for stressing. This produces a force-related progressive spring restoring force that increases as a result of the increasingly shorter lever arm of the spring, growing with the force applied to the spring. This means that the travel for the spring can be kept small.

BRIEF DESCRIPTION OF THE DRAWING

In addition the invention is best understood with reference to particularly embodiments referring to the drawing. In the drawing.

Figure 1:
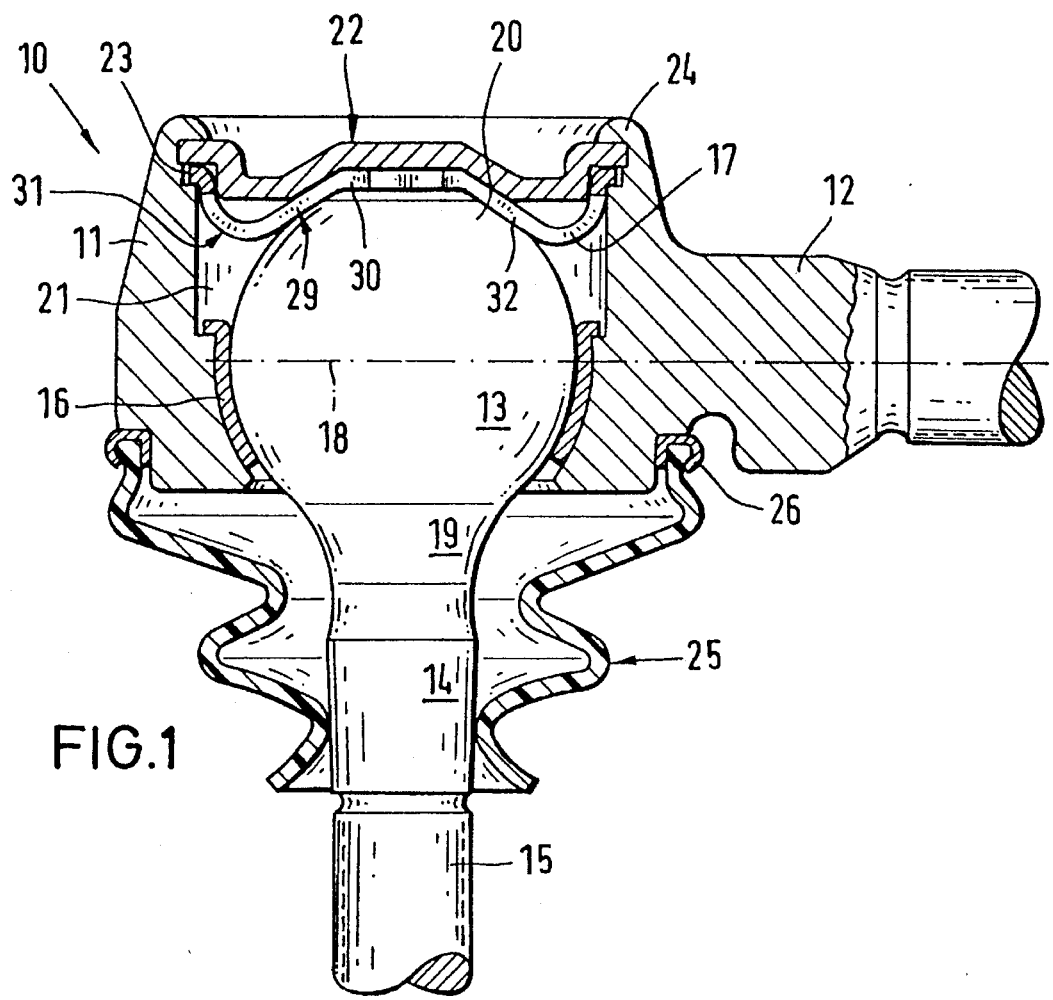
FIG. 1 is a section through a ball joint according to the invention.

A ball or ball-cup joint shown generally at 10 basically comprises a forged housing 11 integrally formed with a connection piece 12, e.g. for a control arm or the like of a steering system for motor vehicles. The second main part of the ball joint 10 consists of a ball 13 with a ball stem 14 and appropriate connecting piece 15. A lower bearing cup 16 and an upper bearing cup 17 are provided for slidably holding the ball 13 in the housing 11, the lower bearing cup 16 holding the ball 13 generally below its equator 18, that is around the neck 19, and the upper bearing cup 17 lying on the ball head 20. The chamber 21 is outwardly closed by means of a cover 22. This is snap fitted with the edge 23 of the upper ball cup 17 of the housing 11, this upper edge 24 being roller deformed inward over the edge of the cover 22.

For completeness there is a bellows-type rubber cuff seal 25 which is held by means of a retaining ring 26 on the housing 11.

Figure 2:
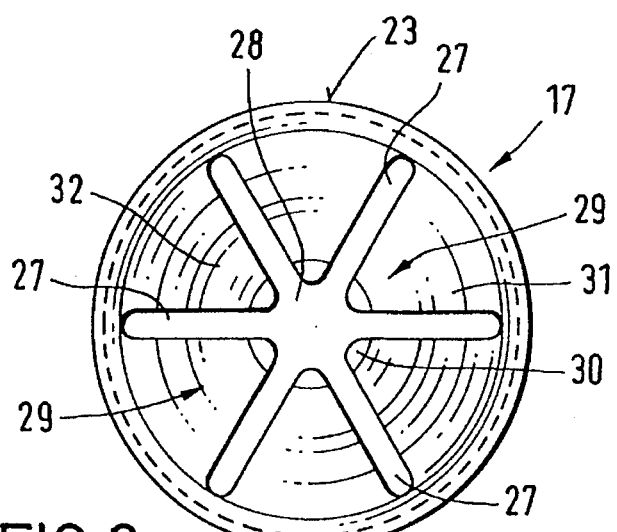
FIG. 2 is a view of the upper ball cup formed as a disk-washer compression spring.
Figure 3:
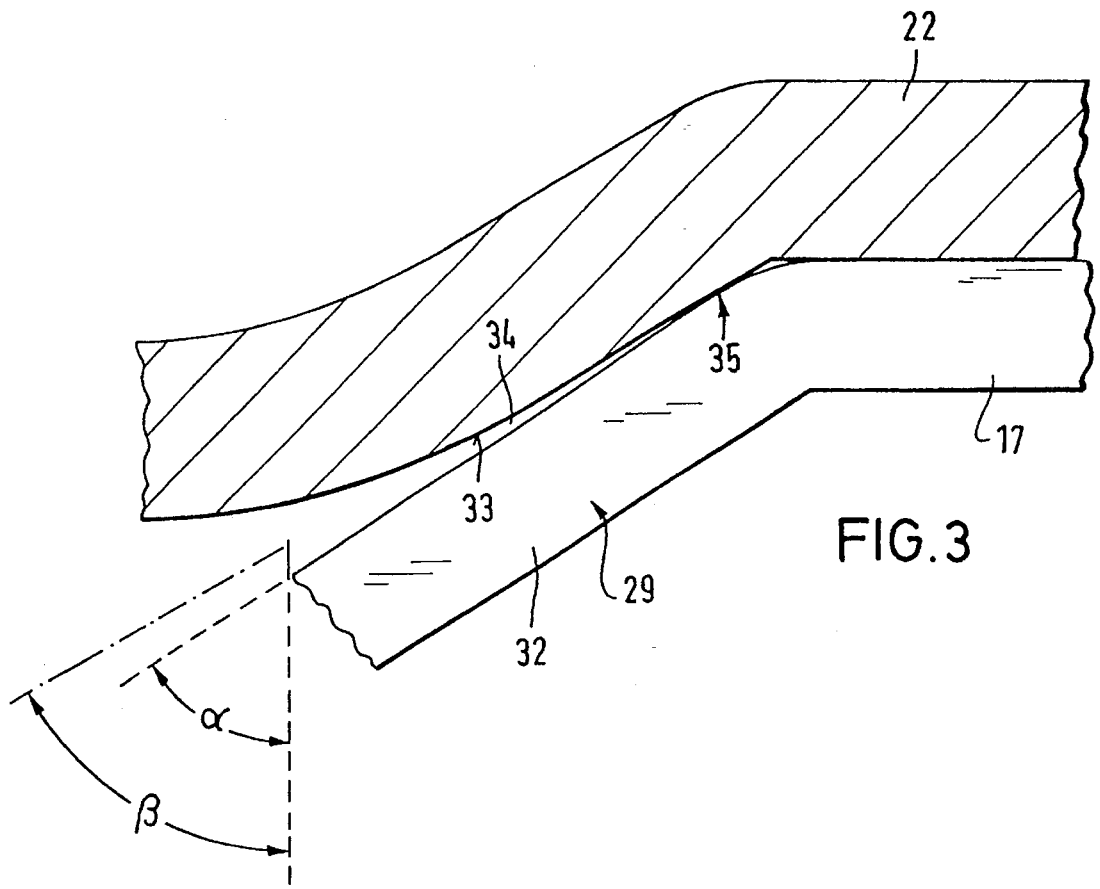
FIG. 3 is a greatly enlarged section of the contact region between the upper ball cup and the cover in the normally loaded condition.
Figure 4:
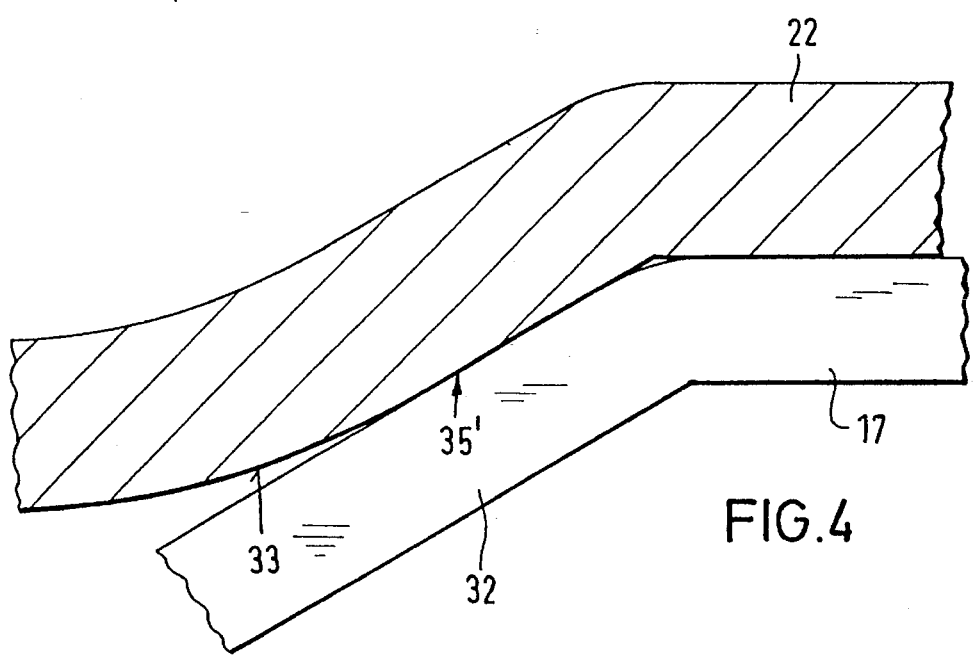
FIG. 4 is a view like FIG. 3 but under increased pressure.

The novelty of the new ball joint 10 is that the upper ball cup 17 is also formed as a compression spring and bears continuously on the cover 22 and also on the ball head 20. The upper ball cup 17 has the shape shown in FIG. 1 and is in top view (FIG. 2) generally disk shaped. It has a continuous circumferential rim 23 and is subdivided by means of radial cuts 27 that extend to the center 28 into individual segments 29. These segments 29 thus form separate spring tongues like cantilevered leaf springs. Each segment 29 bears with its tip 30 below a central region of the cover 22. Each segment 29 is mainly elastically deformable between this contact point and a stiff surrounding zone 31. This is the actual bendable section 32 of each of the spring tongues 29 which, as shown in FIG. 1, extend tangent along a frustocone on the ball. The outside of these bendable sections 32, as shown in particular in FIGS. 3 and 4, confronts an also frustoconical support surface 33 of the cover 22. The cone angle at which the contact surfaces of the spring tongues 32 are set is shown in FIG. 3 at α while the cone angle of the adjacent support surfaces 33 is seen at β. This latter is slightly greater than α so that a narrow generally wedge-shaped space 34 is left between the engageable surfaces. In addition the support surface 33 is somewhat convex relative to the bendable section 33 of the upper ball cup 17. The result of this is that with increased load (FIG. 4 compared to FIG. 3) the contact point on the surface 33 (FIG. 3) moves inward from a starting position (at the edge 23) to 35 (FIG. 4). Thus the spring travel is shorter with increasing force so that the progressivity of the spring characteristic line of the bendable sections 32 increases more strongly than in the case of one-sided contact (that is with an unmoving point 35 as in FIG. 3). Thus the restoring force of the ball-cup spring 17 is greater as the forces effective on the spring arrangement grow.

The illustrated and described arrangement is, as particularly visible in FIG. 1, of very simple construction, functions silently, and in addition has fewer parts than in the prior art in which an additional coil compression spring is provided between the cover 22 and the rigid upper ball cup 17 that is not formed as a spring.

I claim:

1. A ball joint comprising:

a housing forming a cavity;

a ball in the housing;

a stem fixed to the ball and extending downward out of the housing;

a rigid cover fixed in the housing and upwardly closing the cavity over the ball;

a metallic lower ball cup in the cavity traversed by the stem and engaged between a lower portion of the ball and the housing and complementarily fitted to the lower portion of the ball; and a metallic spring-plate upper ball cup between the ball and the cover, separate from and out of contact with the lower ball cup, and having cutouts defining at least one portion bearing resiliently upward on the cover and at least one portion bearing resiliently downward on the ball.

2. The ball joint defined in claim 1 wherein the upper ball cup has an outer rim clamped between the cover and the housing and constituting the one portion bearing upward on the cover.

3. The ball Joint defined in claim 2 wherein the cutouts are radially extending slits forming radially extending segments constituting the portion bearing downward on the ball.

4. The ball joint defined in claim 1 wherein the cover has a generally frustoconical downwardly directed portion engageable with the upper ball cup and having a predetermined cone angle, the portion of the upper ball cup bearing on the cover being generally frustoconical and having an cone angle smaller than that of the cover.

5. The ball joint defined in claim 4 wherein the downwardly directed portion of the cover is somewhat downwardly convex.

6. The ball joint defined in claim 1 wherein the lower ball cup is separate from and out of contact with the upper ball cup.

\* \* \* \* \*